April 27, 1971    L. H. WATTERS ET AL    3,576,930
METHOD OF PREPARING MOLDED ARTICLES
Original Filed Dec. 29, 1967
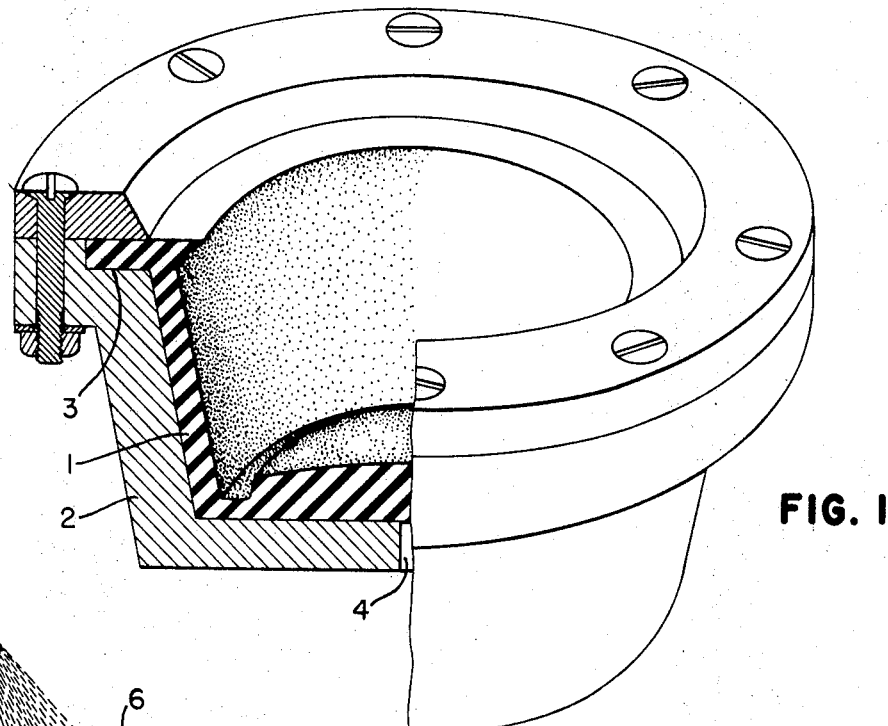
FIG. 1
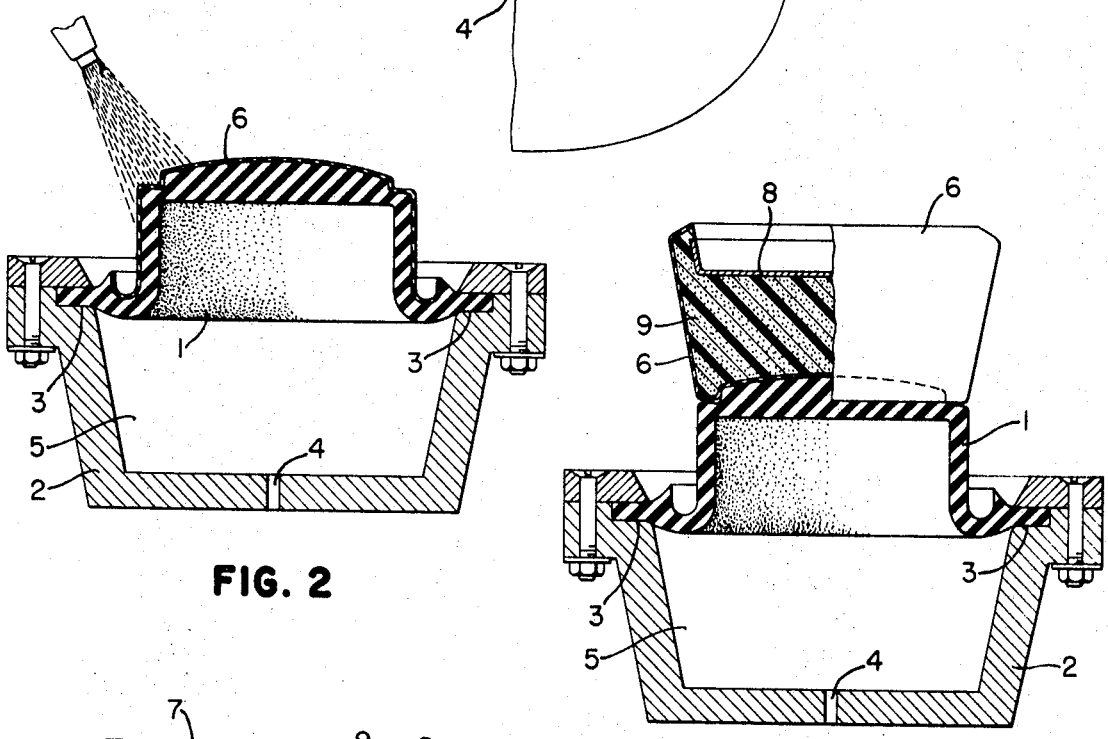
FIG. 2
FIG. 4
FIG. 3
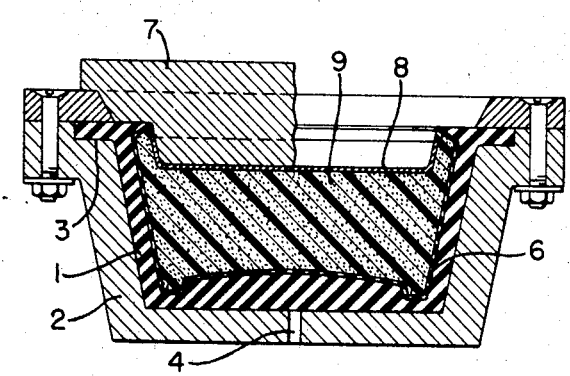
INVENTORS
JOHN G. HUBER
BY  LARRY H. WATTERS
Henry C. Young Jr.
ATTORNEY

United States Patent Office

3,576,930
Patented Apr. 27, 1971

3,576,930
METHOD OF PREPARING MOLDED ARTICLES
Larry H. Watters, Akron, Ohio, and John G. Huber, Nashville, Tenn., assignors to The Goodyear Tire & Rubber Company, Akron, Ohio
Continuation of application Ser. No. 694,587, Dec. 29, 1967. This application Apr. 20, 1970, Ser. No. 28,253
Int. Cl. B29c *13/04;* B29d *27/00*
U.S. Cl. 264—45                                    9 Claims

ABSTRACT OF THE DISCLOSURE

A method of preparing molded articles comprising forming a molded article on the exposed surface of a flexible mold member where the said flexible mold member is attached to a rigid support member, applying a fluid pressure between the flexible mold member and the rigid support member to actuate the flexible mold member away from the rigid support member, thereby defining an enclosed cavity therebetween, and removing the said molded article from the flexible mold member.

---

This is a continuation of application Ser. No. 694,587 filed Dec. 29, 1967, now abandoned.

This invention relates to an improved method of preparing molded articles.

Various contoured molded articles have been prepared by depositing materials on contoured mold surfaces and removing the molded articles from the mold. For example, contoured padded elements such as seat cushions, bumpers and upholstery for automobiles have been prepared which have thermoplastic shells or skins adhered to resilient pads or cores. Such padded elements have been prepared, for example, by forming skins of a polymeric material on the contoured surface of a mold followed by applying a foamable polymeric material to the skins while the skins are still on the mold surface and foaming the polymeric material to form the padded element. Heretofore, padded elements when formed by such a method in a mold having intricate contours have been difficult to remove from the mold without an attendant danger of tearing or destroying a part of the skin.

It is therefore an object of this invention to provide an improved method of preparing molded articles.

In accordance with this invention it has been found that molded articles can be prepared by the method which comprises forming a molded article on the exposed or inner surface of a flexible mold member where the said flexible mold member is attached to a rigid support member, applying a fluid pressure between the flexible mold member and the rigid support member to actuate the flexible mold member away from the rigid support member, thereby defining an enclosed cavity therebetween, and removing the said molded article from the flexible mold member.

The advantages and objects of this invention may be more readily understood by reference to the drawings wherein FIG. 1 is a perspective view in section of a mold having a flexible mold member attached to a rigid support member, where the flexible mold member is disposed inwardly toward the rigid support member; FIG. 2 is a partial fragmented cross-sectional view of the mold having the flexible mold member distended outwardly away from the rigid support member forming an enclosed cavity therebetween and having a coating of an uncured liquid polymeric coating thereon; FIG. 3 is a partial fragmented cross-sectional view of the mold having the flexible mold member disposed inwardly toward the rigid support member and having a flexible polymeric layer deposited thereon; and FIG. 4 is a partial fragmented cross-sectional view of the mold having the flexible mold member distended outwardly from the rigid support member and supporting a molded composite structure comprising a flexible polymeric covering adhered to a foam pad.

Reference to the figures shows a flexible mold member 1 such as a contoured silicone rubber or cured polyurethane attached to a rigid support member 2 at position 3. The rigid support member is provided with an aperture 4 to allow a fluid pressure between the enclosed surfaces of the flexible mold and rigid support members to be adjusted. The term "rigid support" is used in this specification to describe a support for the flexible mold member having a greater rigidity than that of the flexible mold member. The rigid support can be of various materials such as metals, plastics, wood, cured natural rubber and synthetic rubber-like polymeric materials. A fluid pressure is applied to the aperture 4 to distend the flexible mold member 1 outwardly away from the rigid support 2 to form a cavity 5 therebetween. The fluid pressure can be provided by the various fluids such as inert gases and liquids exemplary of which are air, nitrogen and water. A layer 6 of flexible polymeric material such as a cured polyurethane is deposited on the exposed surface of the flexible mold member by first applying at least one spray coat of a sprayable mixture such as a liquid polyurethane reaction mixture onto the distended flexible mold member 1. The fluid pressure within the cavity 5 is reduced to actuate the flexible mold member 1 inwardly toward the rigid support member 2. The spray coats of the polyurethane reaction mixture are allowed to cure to form a flexible cured polymeric polyurethane shell 6 deposited on the flexible mold member 1.

The spray coats of polyurethane reaction mixture can be dried and cured within a relatively short time, with the application of heat if desired, usually within about an hour or less depending upon the nature of the polyurethane reaction mixture and whether a catalyst is utilized.

It is preferred that the flexible mold member 1 does not tightly adhere to the deposited flexible polymeric shell. If desired, the flexible mold member 1 can be provided with a release agent coating to assist in the prevention of adherence of the deposited flexible polymeric shell.

A liquid foamable material such as a polyurethane reaction mixture is applied in the cavity to a part of the surface of the cured polymeric shell 6. A cover 7 and mounting bracket 8 are placed over the mold and the foamable reaction mixture is allowed to foam and expand to contact the surfaces of the deposited flexible polymeric shell and mounting bracket 8 and cured to form a shaped cured flexible cellular polyurethane 9 adhered to the cured polymeric shell and mounting bracket thereby forming the composite structure. The foamable polyurethane reaction mixture is usually foamed and cured in a relatively short time such as about 20 minutes or less. The fluid pressure in the cavity 5 is then increased to activate the flexible mold member 1 outwardly from the rigid support member 2 and the said composite structure having the mounting bracket adhered thereto is removed from the flexible mold member. The mounting bracket is used to facilitate the attachment of the composite structure to other structures.

It is to be understood that although in the description of the drawings a sprayable liquid polyurethane mixture is used to deposit a flexible polymeric material on the surface of the flexible mold member, in the practice of this invention other materials can also be deposited thereon, particularly in its inwardly disposed position. For example, suspensions or solutions of thermoplastic, thermosetting and rubberlike polymeric materials can be applied to the surface of the flexible mold member followed by the coagulation and drying of the plastic and rubberlike materials. Also, other materials can be applied by the deposition of molten materials such as molten thermoplastic polymers followed by the cooling and solidifying of the molten materials. It is preferred to deposit polyurethanes because of ease of handling of polyurethane reaction mixtures and their fast reaction time. Although it is preferred that the plastic and rubberlike materials are deposited by spraying, it is to be appreciated that they can be applied by other suitable methods such as by brushing, dipping and pouring, and the well known slush molding and rotational molding methods.

Where the method of this invention is used to prepare a composite structure having a polymeric skin adhered to foam pads, it is usually desired that a sufficient amount of the polymeric material is deposited on the surface of the flexible mold member to provide a layer or skin of the polymeric material having a thickness of from about 1 to about 50 mils.

In the practice of this invention the flexible mold member can be prepared from various flexible polymeric materials. It is preferred that such flexible polymeric materials do not tightly adhere to the molded article when it is formed on the surface of the flexible mold member. Representative of such flexible polymeric materials are the flexible silicone rubbers which are generally cured at room temperature. Other flexible materials can be used for the mold member which usually require release agents or parting films. Rrepresentative of the various flexible materials are flexible polyurethanes, cured millable gum silicone rubbers, cured natural rubber and the various synthetic rubbers such as rubbery polymers of conjugated dienes such as 1,4 addition polymers of 1,3-butadiene and of isoprene, polychloroprene; the rubbery copolymers of butadiene and styrene which contain a major proportion of butadiene, particularly copolymers of butadiene and styrene of that hot and cold SBR type which contain from 60 to about 90 percent by weight of butadiene; copolymers of butadiene and acrylonitrile; butyl rubber, which is a polymerization product of a major proportion of a mono olefin, such as butylene, and a minor portion of multi-olefin, such as butadiene and isoprene; copolymers of ethylene and propylene; and terpolymers of ethylene, propylene and a minor proportion of a nonconjugated diene and flexible polymers formed by the open ring polymerization of unsaturated alicyclic compounds having from one through three carbon-to-carbon double bonds in the alicyclic ring such as polyoctenamers and polydodecenamers.

The flexible mold member can be coated with various release agents well known to those skilled in the molding art, and the term "flexible mold member" used in this specification refers to flexible mold members having a release agent coating when such a coating is desired. Representative of the various release agents for the surface of the flexible mold member are those that do not tightly adhere to the molded article when it is formed on the flexible mold surface. Some of the many suitable release agents include the polyethylene and polypropylene waxes and emulsions, natural waxes, synthetic waxes, dimethyl silicone fluids, greases and higher polymers, soya bean fatty acid types or vegetable cephalin and lecithin, soaps, fluorocarbons, polyvinyl alcohol and fluorosilicones.

In addition to polyurethane reaction mixtures and molten polymeric materials, various suspensions and solutions of materials can be used to deposit the polymeric materials on the surface of the flexible mold member. For example, suspensions comprising dispersions and emulsions of thermoplastic polymers, thermoset polymers, rubbery polymers and copolymers and plasticized particulate vinyl resins can be used.

Representative examples of the rubbery polymers and copolymers are natural rubber and various synthetic rubbers such as rubbery polymers of conjugated dienes including polychloroprene, the rubbery copolymers of butadiene and styrene which contain a major proportion of butadiene, particularly copolymers of butadiene and styrene of the hot and cold SBR type which contain from about 60 to about 99 percent by weight of butadiene, copolymers of butadiene and acrylonitrile, butyl rubber, which is a polymerization product of a major proportion of a mono olefin, such as butylene, and a minor portion of multi-olefin, such as butadiene and isoprene, rubbery polymers of isoprene, rubbery polymers of 1,3-butadiene, rubbery copolymers of ethylene and propylene and rubbery trepolymers of ethylene, propylene and a minor proportion of a diene. Aqueous emulsions of such rubbery polymers and copolymers are particularly suitable. The suspensions of the rubbery polymers and copolymers can be compounded with suitable vulcanizing materials such as sulfur and with vulcanization accelerators so that they can be cured after their deposition.

Representative plasticized vinyl resins are plasticized polyvinyl chloride and plasticized copolymers of vinyl chloride with another vinyl compound such as vinyl chloride-vinyl acetate copolymers, vinyl chloride-vinyl ether copolymers, vinyl chloride-maleate or fumarate copolymers and vinyl chloride-vinylidene chloride copolymers. The particulate vinyl resins can be plasticized with plasticizers well known to those skilled in the art, applied to the surface and heated to coalesce the resin particles and form a flexible layer.

Polyurethane reaction mixtures are useful in the practice of this invention for the preparation of the flexible mold member, for the preparation of various articles to be molded thereon, and for foamable mixtures when the method of this invention is used to prepare padded articles. It is understood that such polyurethanes, including cellular polyurethanes, except when used for the flexible mold member, can be either flexible or rigid.

The polyurethane reaction mixtures used in this invention include mixtures of the materials that are commonly used to prepare rigid or flexible polyurethanes and polyurethane foams by the well-known one-shot, prepolymer or semi-prepolymer techniques. For example, see U.S. patent applications having Ser. Nos. 456,504 and 670,276, filed May 17, 1965, and Sept. 25, 1967, respectively.

Generally, the polyurethane reaction mixtures are prepared from at least one reactive hydrogen containing polymeric material as determined by the Zerewitinoff method and at least one organic polyisocyanate. It is to be understood that the polyurethanes referred to in this specification may also contain polyurea linkages.

The foamable polyurethane reaction mixture can contain water or various well-known inert fluid-expanding or blowing agents to cause the said reaction mixture to foam. It is usually desired that the inert fluid-expanding agents be gaseous at room temperature. The term "inert" means that the expanding agent does not detrimentally react with the reaction mixture. Representative examples of various blowing agents include air, nitrogen, carbon dioxide and halogenated hydrocarbons, exemplary of which are methylene chloride, trichloromonofluoromethane, dichlorodifluoromethane and 1,2-dichlorotetrafluoroethane. The foamable polyurethane reaction mixture can also contain relatively small amounts of various catalysts well known to those skilled in the art to increase its rate of reaction as well as various surfactive agents to assist in controlling the cell structure of the resultant foam.

In the preparation of the various polyurethane reaction mixtures usually the more useful reactive hydrogen containing polymeric materials comprise at least one member selected from the group consisting of polyester polyols, polyether polyols, dihydroxy-terminated polymers of conjugated diene hydrocarbons, and castor oil. The reactive hydrogen-containing material generally used has a molecular weight between about 700 and about 5000 and, usually, between about 1000 and about 4000. Generally, the polyester polyols are the preferred active hydrogen-containing material where high strength and solvent resistance are desired.

Where foamable polyurethane reaction mixtures are to be prepared, to form rigid and flexible cellular polyurethanes, polymeric reactive hydrogen containing compounds having relatively low molecular weights (hydroxyl numbers of from about 350 to about 600) can be used to prepare rigid foams and such compounds having relatively high molecular weights (hydroxyl numbers of from about 30 to about 120) can be used to prepare flexible foams. The density of the prepared foam is dependent somewhat upon the type and amount of fluid expanding agent used.

Usually the ratio of isocyanate groups of the polyisocyanate, preferably an organic diisocyanate, to the reactive hydrogen-containing groups of the reactive hydrogen-containing polymeric material is from about 1.1/1 to about 12/1 and preferably about 1.2/1 to about 2.5/1. These materials can be reacted at temperatures from about 20° C. to about 150° C. to form a polyurethane prepolymer. The reactive hydrogens are supplied by hydroxyl groups and amine groups. This prepolymer can be dissolved or dispersed in the solvent to form a solution or dispersion which is then mixed with a catalyst, chain extending agent, and/or a crosslinking agent to form a polyurethane reaction mixture.

Agents which promote chain extension and crosslinking of the polymer are also useful and are sometimes known as curing agents which facilitate reacting the polyurethane reaction mixture to set and gel. Diamines, hydrocarbon diols, such as ethylene glycol and propylene glycol, hydroxyl-amines such as triisopropanolamine, are used in this invention as such agents. When these agents are used they are usually added to a polyurethane prepolymer in a ratio of from about 0.5/1 to about 1.5/1 and, preferably, about 0.8/1 to about 1.0/1 amine and/or hydroxyl groups of the chain extending and crosslinking agent for each isocyanate group in excess of the reactive hydrogen groups of the reactive hydrogen-containing polymeric material. Bifunctional materials such as glycols and diamines are generally preferred as chain extending and crosslinking agents. In general the bifunctional materials yield products having superior spraying properties. Other methods known to those skilled in the art of preparing polyurethane reaction mixtures with or without solvents being present may also be used.

When used as a molding material, except for foamable polyurethane reaction mixtures, a solvent is usually added to the reaction mixture so that it will be in the form of a fluid mixture or solution. Generally, sufficient solvent is added to form a solution containing from about 30 to about 65 percent solids. However, a higher or lower concentration of solids can be used. When the solids concentration is low, the individual application will deposit a thin layer of the polyurethane polymer, and a large amount of the solvent will have to be removed during the curing process. A solids concentration of 40 percent or higher is generally desired.

Various nonreactive solvents known to those skilled in the polyurethane art can be used for the preparation of the prepolymer solutions and polyurethane reaction mixtures. Representative examples of the solvents are aromatic solvents such as benzene, xylene and toluene; and the liquid lower ketones such as acetone, methyl ethyl ketone, methyl isobutyl ketone, and diisobutyl ketone. If the polyurethane reaction mixtures are to be used to prepare the cured polyurethanes in confined areas which are subject to explosive hazards, nonflammable chlorinated solvents can be used to form non-flammable polyurethane reaction mixtures. Mixtures of the solvents may also be used to obtain satisfactory spreading properties and evaporation rates when the polyurethane spray composition is applied to a polymeric surface.

If desired, pigments, surface-active agents, leveling agents, such as cellulose acetate butyrate, and other additives well known to the spray-coating art can be added to the solution or dispersion of the polyurethane reaction mixture. When a pigment is added, it is added in an amount from about 0.5 to 10 parts and, preferably, in the amount from about one to two parts of pigment per hundred parts of prepolymer by weight. Submicroscopic pyrogenic silica has been found to be an effective thixotropic agent. This material is prepared by the vapor phase hydrolysis of silicon tetrachloride. Such silica, sold under the trademark Cab-O-Sil by Godfrey L. Cabot, Inc., is useful as a thixotropic agent in the sprayable polyurethane compositions when used in about 0.1 to 10 parts by weight per 100 parts of the prepolymer in the solution. The preferred amount is from about 0.5 to about 4 parts by weight. This range of pyrogenic silica gives improved thixotropic properties to the resulting sprayable composition.

The following examples further illustrate the invention and are not intended to be limitative. In these examples the parts and percentages are by weight unless otherwise indicated.

EXAMPLES 1 AND 2

Two molds were prepared each with a contoured flexible mold member and a rigid support member having the general shape of the mold shown in FIGS. 1-4 where the inside diameter of the flexible mold member was about 3¼ inches and its depth was about 2 inches. The rigid support member was made of wood and was provided with an aperture in its bottom having a diameter of about one-fourth inch. One mold had a contoured concave silicone rubber flexible mold member and the other mold had a contoured concave polyurethane flexible mold member attached to the wooden rigid support. The polyurethane member had a release agent coating of a soya bean fatty acid.

Composite structures having flexible polyurethane shells adhered to flexible cellular polyurethane pads were prepared from each of the molds by the following method.

Air pressure was applied through the aperture in the bottom of the rigid support member to force the flexible mold member to distend outwardly from the rigid support. In this position a layer of a liquid polyurethane reaction mixture was spray coated over the surface of the distended flexible mold member.

The air pressure was removed and a vacuum, or a negative pressure, applied to the enclosed cavity between the flexible mold member and the rigid support, thereby actuating the flexible mold member inwardly toward the rigid support. In this description the term "reduced pressure" includes negative pressures. The layer of polyurethane was then cured for about 15 minutes at a temperature of about 60° C. to form a cured flexible polyurethane shell on the surface of the flexible mold member.

A foamable polyurethane reaction mixture was applied to a part of the surface of the cured polyurethane shell followed by the placement of a cover over the mold having a mounting bracket lightly adhered thereto. The foamable polyurethane reaction mixture was allowed to expand to fill the mold cavity and cured for about 10 minutes at about 25° C. to adhere to the flexible polyurethane layer and the mounting bracket.

The cover was removed from the mold, leaving the mounting pracket adhered to the cured foamed polyurethane. Air pressure was applied through the aperture in the rigid support actuating the silicone rubber mold outwardly from the support member in a manner shown by FIG. 4 and the composite structure that comprised a polyurethane skin integrated with the foam pad having the mounting bracket adhered thereto was removed from the mold.

The silicone rubber flexible mold used in this example was prepared by casting a liquid room temperature vulcanizing silicone rubber over the surface of a shaped leather grained substrate. Other room temperature vulcanizing silicone rubbers, as well as millable gum silicone rubbers can be used and are well known to those skilled in the art. For example, see U.S. patent application having Ser. No. 673,964, filed Oct. 9, 1967. The silicone rubber was cured at about 25° C. for eight hours and was easily removed from the leather grained substrate to form a flexible, self-releasing silicone rubber flexible mold member having a surface being a negative reproduction of the leather grained surface of the said substrate. The molds of silicone rubber were then further post-cured for about 3 days at about 82° C. and for about 8 hours at about 250° F. The liquid room temperature curing silicone rubber used to prepare the flexible molds was prepared by mixing Components A and B of RTV 588 (obtained from The Dow Corning Company), immediately prior to preparing the mold of silicone rubber. Component A comprised a mixture of a prepolymer, chain extender, stabilizers, oils and fillers. The prepolymer was a silanol terminated polyorganosiloxane, and the chain extender a polyalkoxy substituted polyorganosiloxane. Component B comprises dibutyltin dilaurate catalyst, fillers and oils.

The contoured flexible mold member comprising the flexible cured polyurethane was prepared from a prepolymer of a polybutadiene polyol having a molecular weight of about 3000 and a hydroxyl number of about 40 and 4,4'-methylene-bis-(cyclohexylisocyanate), a hydrocarbon diol curative, and a small amount of a catalyst to accelerate the curing reaction.

The polyurethane reaction mixture used for forming the flexible polyurethane shell on the flexible mold members of this example was prepared by mixing a polyurethane prepolymer solution with a diamine solution. The polyurethane prepolymer was prepared at about 150° C. from a mixture of 1,4-butane diol adipates having an average molecular weight of about 1500 and an average hydroxyl number of about 84 and 4,4'-dicyclohexyl methane diisocyanate and dissolved in a chlorinated hydrocarbon solvent which contained a small amount of a colouring pigment.

Just before application to the mold substrate, the polyurethane prepolymer was mixed with a curative solution which consisted of an organic diamine and acetone.

The foamable polyurethane reaction mixture used to prepare the cellular cured polyurethane pads in this example was prepared from a mixture of a polyether triol having a molecular weight of about 3200 and a hydroxyl number of about 52 and a polypropylene oxide adduct of pentaerythritol, toluene diisocyanate, a polymeric polyol having a molecular weight of about 3500 and a hydroxyl number of about 42, trimethanol propane, calcium stearate, a blocked copolymer of alkylene dialkyl silicone, a mixture of organic diamines and water.

Addition polyurethane reaction mixtures can be used for this example, exemplary of which are reaction mixtures shown in du Pont de Nemours & Company Bulletin HR-26 of April 1958 and foamable mixtures shown in U.S. Pat. 3,072,582.

The method of this invention is particularly useful for the preparation of molded padded elements such as seat cushions, crash pads, bumpers and upholstery for automobiles which have thermoplastic layers, shells or skins adhered to resilient foam pads. The method is also useful for preparing solid molded articles which can be rigid, flexible or rubbery in nature.

The invention can be practiced by coating the exposed surface of the flexible mold member in its distended position with a liquid polymeric material in order to facilitate efficiently coating intricate portions of the flexible mold surface, following which the flexible mold member is actuated inwardly toward the rigid support member to form a generally concave mold, and the liquid polymeric material is then cooled, coalesced, dried, or cured to form a polymeric layer, shell, or skin on the flexible mold surface. This is done as a convenience with the primary objective being to deposit a polymeric material on the surface of the flexible mold member has a generally concave configuration or surface, it is not intended that the flexible mold member be limited to such a configuration. Thus it can also have a generally planar or a convex surface.

Molded articles removed from concave flexible molds by applying unequal pressures and forces to the mold surface, such as by mechanical manipulation, to cause the flexible mold to activate outwardly such as inverting the flexible mold are subject to being unnecessarily damaged as well as a similar attendant danger to the flexible mold member. Therefore the method of this invention has particular utility where the fluid pressure between the flexible mold and rigid support member is applied equally over the enclosed surface area of the flexible mold member to actuate the said flexible mold member away from the rigid support as a means for removing a molded article from the mold.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing molded articles which comprise the steps of
   (a) spray coating at least one coat of a liquid polyurethane reaction mixture onto the exposed surface of a flexible contoured molded member attached to a rigid support member to form an enclosed cavity therebetween and distended outwardly from the said rigid support by the application of fluid pressure to the said enclosed cavity, wherein the said exposed mold surface has the property of not tightly adhering to the said polyurethane reaction mixture when cured,
   (b) applying a reduced fluid pressure to the said enclosed cavity to arctuate the said flexible mold member having the liquid polyurethane reaction mixture coating thereon toward the said rigid support member to shape the said flexible mold member,
   (c) forming a shaped flexible solid polymeric layer by curing the said polyurethane reaction mixture coating on the surface of the flexible mold member, and
   (d) applying a fluid pressure in the said cavity between the flexible mold member and the rigid support member to actuate the flexible mold member outwardly from the rigid support member.

2. A method according to claim 1 wherein the said fluid pressure is supplied by an inert gas.

3. A method according to claim 2 wherein the said flexible mold member is a silicone rubber.

4. A method according to claim 2 wherein the said polyurethane reaction mixture is prepared from at least one reactive hydrogen containing polymeric material selected from at least one compound having a molecular weight between about 700 and about 5000 and selected from the group consisting of polyester polyols, polyether polyols, dihydroxy terminated polymers of conjugated diene hydrocarbons and castor oil, organic diisocyanate, and a curing agent selected from the group consisting of diamines, hydrocarbon diols and hydroxylamines.

5. A method of forming a composite structure according to claim 1 comprising a foamed polymeric pad having adhered to its exterior a shaped flexible polyurethane layer which comprises
   (a) applying a foamable polymeric mixture onto the surface of the said shaped flexible solid polymeric layer of cured polyurethane on the said flexible contoured mold member actuated and shaped inwardly toward the said rigid support member by reduced fluid pressure applied to the said cavity between the mold member and support member;
   (b) foaming the said foamable polymeric material to form the said composite structure in the said flexible mold member;
   (c) applying a fluid pressure in the said cavity between the flexible mold member and rigid support member to actuate the flexible mold member and composite structure outwardly from the rigid support member, and (d) removing the said composite structure from the flexible mold member.

6. A method according to claim 5 wherein the said polyurethane reaction mixture is prepared from at least one reactive hydrogen containing polymeric material selected from at least one compound having a molecular weight between about 700 and about 5000 and selected from the group consisting of polyester polyols, polyether polyols, dihydroxy terminated polymers of conjugated diene hydrocarbons and castor oil, organic diisocyanate, and a curing agent selected from the group consisting of diamines, hydrocarbon diols and hydroxylamines.

7. A method according to claim 5 where the said foamable polymeric mixture applied onto the surface of the shaped flexible polymeric material layer is a foamable polyurethane reaction mixture.

8. A method according to claim 6 wherein the said fluid pressure is supplied by an inert gas.

9. A method according to claim 8 wherein the flexible mold member is a silicone rubber.

References Cited

UNITED STATES PATENTS

| | | | |
|---|---|---|---|
| 3,187,069 | 6/1965 | Pincus | 264—90X |
| 3,337,660 | 8/1967 | Bagby | 264—1 |
| 3,347,966 | 10/1967 | Seefluth | 264—335X |
| 3,410,936 | 11/1968 | Juras | 264—90 |

FOREIGN PATENTS

| | | | |
|---|---|---|---|
| 1,222,612 | 1960 | France | 264—316X |
| 898,242 | 1962 | Great Britain | 264—338 |

ROBERT F. WHITE, Primary Examiner

R. R. KUCIA, Assistant Examiner

U.S. Cl. X.R.

264—89, 309, 314, 316